US012605904B2

(12) United States Patent
Okonski et al.

(10) Patent No.: US 12,605,904 B2
(45) Date of Patent: Apr. 21, 2026

(54) METHODS FOR COMPRESSION MOLDING MULTI-LAYERED AND MULTI-FUNCTIONAL THERMOPLASTIC COMPOSITE STRUCTURES

(71) Applicants: GM GLOBAL TECHNOLOGY OPERATIONS LLC, Detroit, MI (US); SEKISUI Aerospace, Inc., Sumner, WA (US)

(72) Inventors: David A. Okonski, Waterford, MI (US); Selina Xinyue Zhao, Rochester Hills, MI (US); Mary Gilliam, Farmington Hills, MI (US); Blair E. Carlson, Ann Arbor, MI (US); Scott James, Buckley, WA (US); Daniel Miranda, Seattle, WA (US)

(73) Assignees: GM GLOBAL TECHNOLOGY OPERATIONS LLC, Detroit, MI (US); SEKISUI Aerospace, Inc., Sumner, WA (US)

( * ) Notice: Subject to any disclaimer, the term of this patent is extended or adjusted under 35 U.S.C. 154(b) by 146 days.

(21) Appl. No.: 18/483,733

(22) Filed: Oct. 10, 2023

(65) Prior Publication Data

US 2025/0115010 A1 Apr. 10, 2025

(51) Int. Cl.
| | |
|---|---|
| *B29C 70/34* | (2006.01) |
| *B29C 70/88* | (2006.01) |
| *B29C 35/08* | (2006.01) |

(52) U.S. Cl.
CPC ............ *B29C 70/34* (2013.01); *B29C 70/882* (2013.01); *B29C 2035/0811* (2013.01)

(58) Field of Classification Search
CPC ... B32B 37/1045; B29C 70/34; B29C 70/882; B29C 70/885
See application file for complete search history.

(56) References Cited

U.S. PATENT DOCUMENTS

| | | | | |
|---|---|---|---|---|
| 5,057,175 A | * | 10/1991 | Ashton | ............... B32B 37/1045 156/289 |
| 2010/0327489 A1 | * | 12/2010 | MacKinnon | ............ B29C 43/18 264/319 |

(Continued)

FOREIGN PATENT DOCUMENTS

| | | | | |
|---|---|---|---|---|
| DE | 102015111326 A1 | * | 1/2017 | .......... H01M 50/224 |

OTHER PUBLICATIONS

English translation of DE102015111326 (Year: 2017).*

(Continued)

*Primary Examiner* — Scott W Dodds

(57) ABSTRACT

A method for manufacturing a multi-layered and multi-functional thermoplastic composite structure includes supplying a plurality of reinforcing layers including continuous reinforcing fibers and thermoplastic resin to an intermittent press; and supplying at least one functional layer to the intermittent press adjacent to the plurality of reinforcing layers. The at least one functional layer is selected from a group consisting of an electromagnetic shielding layer and a thermal runaway protection layer. The method includes heating and pressing the plurality of reinforcing layers and the at least one functional layer to form a composite laminate.

17 Claims, 6 Drawing Sheets

(56)                    References Cited

U.S. PATENT DOCUMENTS

| | | | | |
|---|---|---|---|---|
| 2013/0082416 A1* | 4/2013 | Wakeman | ............... | B29C 33/14 |
| | | | | 264/259 |
| 2019/0276617 A1* | 9/2019 | Kia | ............................ | C08J 5/04 |
| 2020/0156486 A1* | 5/2020 | Howard | ................... | B60K 1/04 |

OTHER PUBLICATIONS

U.S. Appl. No. 18/483,631, filed Oct. 20, 2023, Gilliam et al.
U.S. Appl. No. 18/483,658, filed Oct. 10, 2023, Okonski et al.
7-fourm.com, "Mobility of the future: CFRP—a material of the future", Jul. 2, 2010. <https://www.7-forum.com/news/Mobilitaet-der-Zukunft-CFK-ein-Werkstoff-3420.html.>.
Hiltscher, Benny, "Information on the mass production of carbon components at BMW", Dec. 8, 2010. <https://www.bimmertoday.de/2010/12/08/infos-zur-grosserienfertigung-von-carbon-bauteilen-bei-bmw/#disqus_thread>.
German Office Action from counterpart DE1020231346911, dated Jul. 18, 2025.

* cited by examiner

110

112

120

110

112

124

110

112

128

METHODS FOR COMPRESSION MOLDING MULTI-LAYERED AND MULTI-FUNCTIONAL THERMOPLASTIC COMPOSITE STRUCTURES

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to methods for manufacturing multi-layered and multi-functional thermoplastic composite structures.

Electric vehicles (EVs) such as battery electric vehicles (BEVs), hybrid vehicles, and/or fuel cell vehicles include one or more electric machines and a battery system including one or more battery cells, modules and/or packs. A battery control module is used to control charging and/or discharging of the battery system during charging and/or driving. Manufacturers of EVs are pursuing increased power density to increase the range of the EVs.

The battery modules and/or battery packs are arranged in enclosures that are typically made of metal such as steel or aluminum. In addition to providing structural support functions, the enclosures may also need to perform other functions such as thermal insulation, fire resistance, and/or electromagnetic shielding. When the structural components are made using aluminum or steel, the structural components may be relatively heavy.

SUMMARY

A method for manufacturing a multi-layered and multi-functional thermoplastic composite laminate includes supplying a plurality of reinforcing layers including continuous reinforcing fibers and thermoplastic resin to an intermittent press; and supplying at least one functional layer to the intermittent press adjacent to the plurality of reinforcing layers. The at least one functional layer is selected from a group consisting of an electromagnetic shielding layer and a thermal runaway protection layer. The method includes heating and pressing the plurality of reinforcing layers and the at least one functional layer to form a composite laminate.

In other features, the at least one functional layer includes a first functional layer arranged on one side of the plurality of reinforcing layers; and a second functional layer arranged on an opposite side of the plurality of reinforcing layers.

In other features, the method includes cooling the composite laminate using the intermittent press after pressing and heating. The method includes arranging the composite laminate in a compression molding tool; arranging discontinuous fiber reinforced material in the compression molding tool; and consolidating the discontinuous fiber reinforced material and the composite laminate to form the multi-layered and multi-functional thermoplastic composite structure.

In other features, the discontinuous fiber reinforced material include chopped unidirectional tape including reinforcing fibers selected from a group consisting of carbon fibers, glass fibers, basalt fibers, aramid fibers, and combinations thereof. The method includes coating the multi-layered and multi-functional thermoplastic composite structure. The method includes curing the coating.

In other features, the compression molding tool includes a heater. The heater comprises an induction heater. The method includes arranging the composite laminate on a support member including a frame defining an inner cavity and a mesh material extending over the inner cavity between edges of the frame. The method includes positioning the composite laminate and the support member in an oven and heating the composite laminate and the support member for a predetermined period.

In other features, the method includes arranging the composite laminate and the support member in a compression molding tool and pressing the composite laminate to form the multi-layered and multi-functional thermoplastic composite structure. The continuous reinforcing fibers are selected from a group consisting of carbon fibers, glass fibers, basalt fibers, aramid fibers, and combinations thereof. The continuous reinforcing fibers are pre-impregnated with a thermoplastic polymer matrix selected from a group consisting of polyether ether ketone (PEEK), polyether ketone ketone (PEKK), polyphenylene sulfide (PPS), polyether imide (PEI), low melt PEEK (LMPEEK), polyaryletherketone (PAEK), and combinations thereof.

A method for manufacturing a multi-layered and multi-functional thermoplastic composite structure includes arranging at least one functional layer in a cavity of a compression molding tool, The at least one functional layer is selected from a group consisting of an electromagnetic shielding layer and a thermal runaway protection layer. The method includes arranging discontinuous fiber reinforced material in the cavity of the compression molding tool; and heating and pressing the at least one functional layer and the discontinuous fiber reinforced material to form the multi-layered and multi-functional thermoplastic composite structure.

In other features, the compression molding tool includes at least one of an induction heater and cooling channels configured to receive coolant. The method includes coating the multi-layered and multi-functional thermoplastic composite structure; and curing the coating.

In other features, the discontinuous fiber reinforced material include chopped unidirectional tape including reinforcing fibers selected from a group consisting of carbon fibers, glass fibers, basalt fibers, aramid fibers, and combinations thereof. The discontinuous fiber reinforced material are pre-impregnated with a thermoplastic polymer matrix selected from a group consisting of polyether ether ketone (PEEK), polyether ketone ketone (PEKK), polyphenylene sulfide (PPS), polyether imide (PEI), low melt PEEK (LMPEEK), polyaryletherketone (PAEK), and combinations thereof.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

While methods for manufacturing a multi-layered and multi-functional thermoplastic composite structure according to the present disclosure are described below in the context of enclosures for batteries and/or electric machines, the enclosures can be used for other applications.

The present disclosure relates to methods for compression molding a multi-layered and multi-functional thermoplastic composite structure. The methods can be used to create high-strength and/or high-stiffness thermoplastic composite structure with functionalities such as thermal runaway propagation (TRP) protection, electromagnetic interference (EMI) shielding, and/or protection from environmental exposure for vehicle and/or other applications. For example only, the multi-layered and multi-functional thermoplastic composite structure can be used as enclosures for batteries and electric machines as well as other components.

Figure 2:
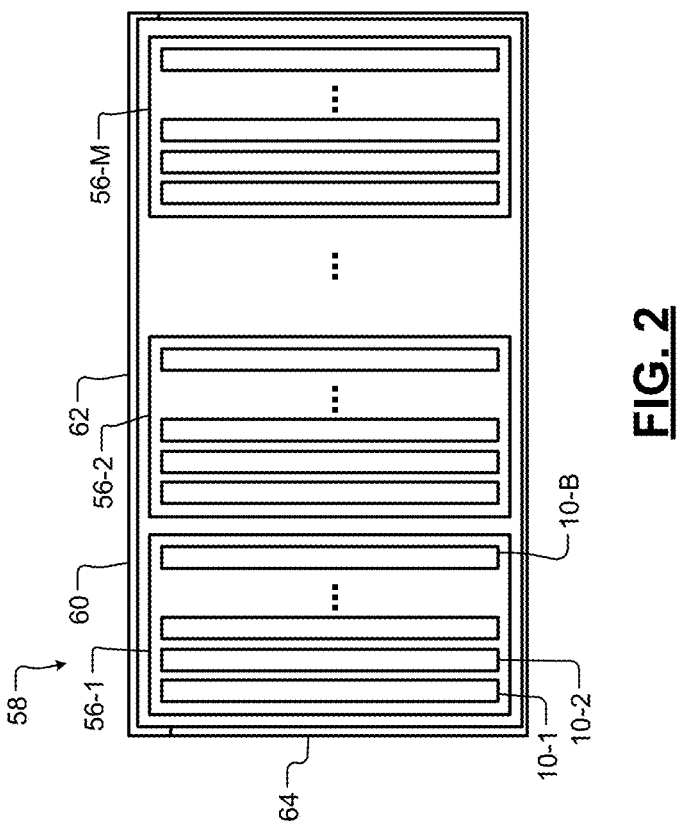
FIG. 2 is a side cross sectional view of an example of a battery pack including a plurality of battery cells arranged in an enclosure made of a multi-layered and multi-functional thermoplastic composite structure according to the present disclosure.
Figure 1:
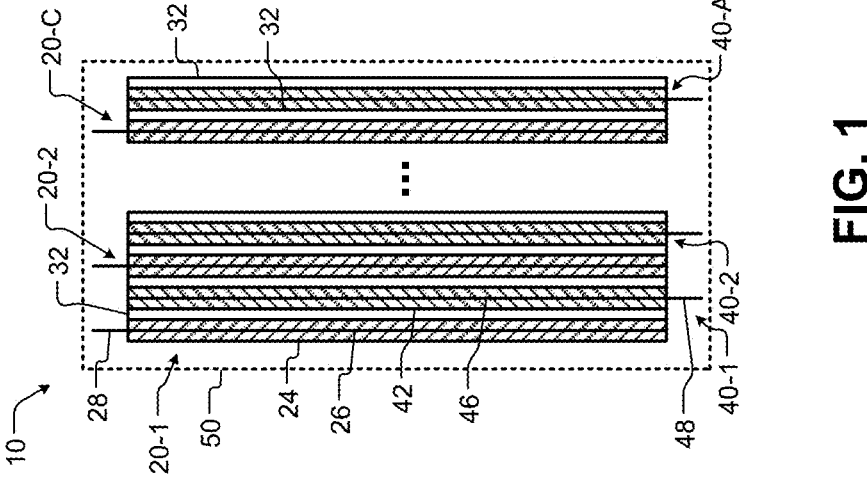
FIG. 1 is a side cross-sectional view of an example of a battery cell.

Referring now to FIGS. 1 and 2, a battery cell 10 includes C cathode electrodes 20-1, 20-2, . . . , and 20-C, where C is an integer greater than one. The C cathode electrodes 20 include cathode active material layers 24 arranged on one or both sides of cathode current collectors 26. The battery cell 10 includes A anode electrodes 40-1, 40-2, . . . , and 40-A, where A is an integer greater than one. The A anode electrodes 40 include anode active material layers 42 arranged on one or both sides of anode current collectors 46.

The C cathode electrodes 20, the A anode electrodes 40, and S separators 32 are arranged in a predetermined order in an enclosure 50, where S is an integer greater than one. For example, the S separators 32 are arranged between the C cathode electrodes 20 and the A anode electrodes 40. External tabs 28 and 48 extend from the current collectors to allow connection of the current collectors to terminals (not shown) of the battery cells. The external tabs 28 and 48 can be arranged on the same side, opposite sides, and/or different sides of the current collectors.

In FIG. 2, a battery pack 58 is arranged in an enclosure 60 and includes M battery modules 56-1, 56-2, . . . , and 56-M each including B of the battery cells 10 (e.g., battery cells 10-1, 10-2, . . . , and 10-B), where B and M are integers greater than one. The enclosure 60 includes a cover 62 and a body 64 (or tray). In some examples, the multi-layered and multi-functional thermoplastic composite structure described further below is used to manufacture the cover 62 and/or the body 64, an enclosure for an electric machine and/or other vehicular or non-vehicular components.

Figure 3A:
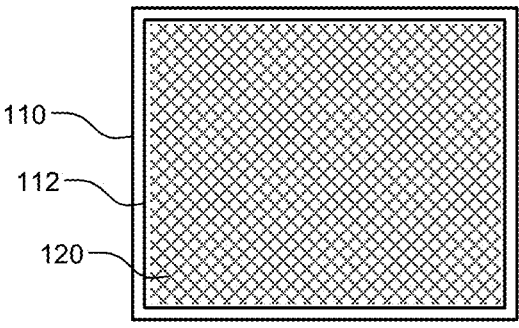
FIGS. 3A to 3C illustrate an example of a method for manufacturing a multi-layered and multi-functional thermoplastic composite structure according to the present disclosure.
Figure 3B:
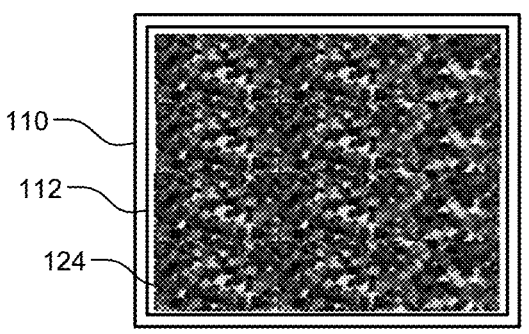
Figure 3C:
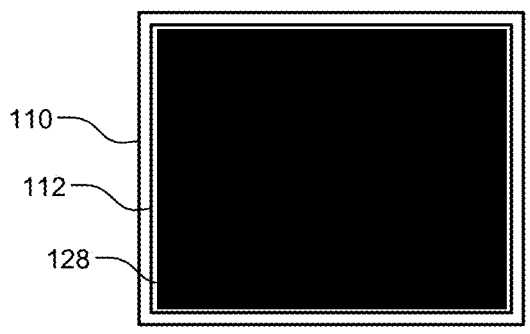

Referring now to FIGS. 3A to 3C, a method for manufacturing a multi-layered and multi-functional thermoplastic composite structure is shown. In FIG. 3A, an electromagnetic shielding material 120 (e.g., a copper wire mesh or other material) is arranged in a cavity 112 of a lower mold portion 110. In FIG. 3B, discontinuous fiber reinforced material 124 (e.g., chopped unidirectional tape) are arranged unidirectionally or randomly dispersed in the cavity 112 of the lower mold portion 110 on the electromagnetic shielding material. In FIG. 3C, fire resistant material 128 is arranged on the discontinuous fiber reinforced material 124.

An upper mold portion (examples shown below) including a plug (shown) is lowered onto the lower mold portion 110, thermoplastic resin is optionally supplied into the mold. In other examples, the discontinuous fiber reinforced materials are pre-impregnated with thermoplastic resin (and resin is optionally supplied). Heat and pressure are applied to form a multi-layered, multi-functional thermoplastic composite structure such as an enclosure. In some examples, the compression pressure is less than 800 psi. In some examples, the compression molding process temperature is less than 750° F. In some examples, the electromagnetic shielding material 120 and/or the fire resistant material 128 are treated using plasma or flame surface treatments to enhance adhesion to the thermoplastic core.

In some examples, the discontinuous fiber reinforced materials are intended to flow into stiffening features of the mold cavity, such as stiffeners, ribs, channels, etc. This feature enables use of pre-consolidated laminates for structural applications (such as floors, walls) and the discontinuous fiber reinforced materials flow into stiffening features, such as stiffeners, channels, ribs, etc.

Figure 4:
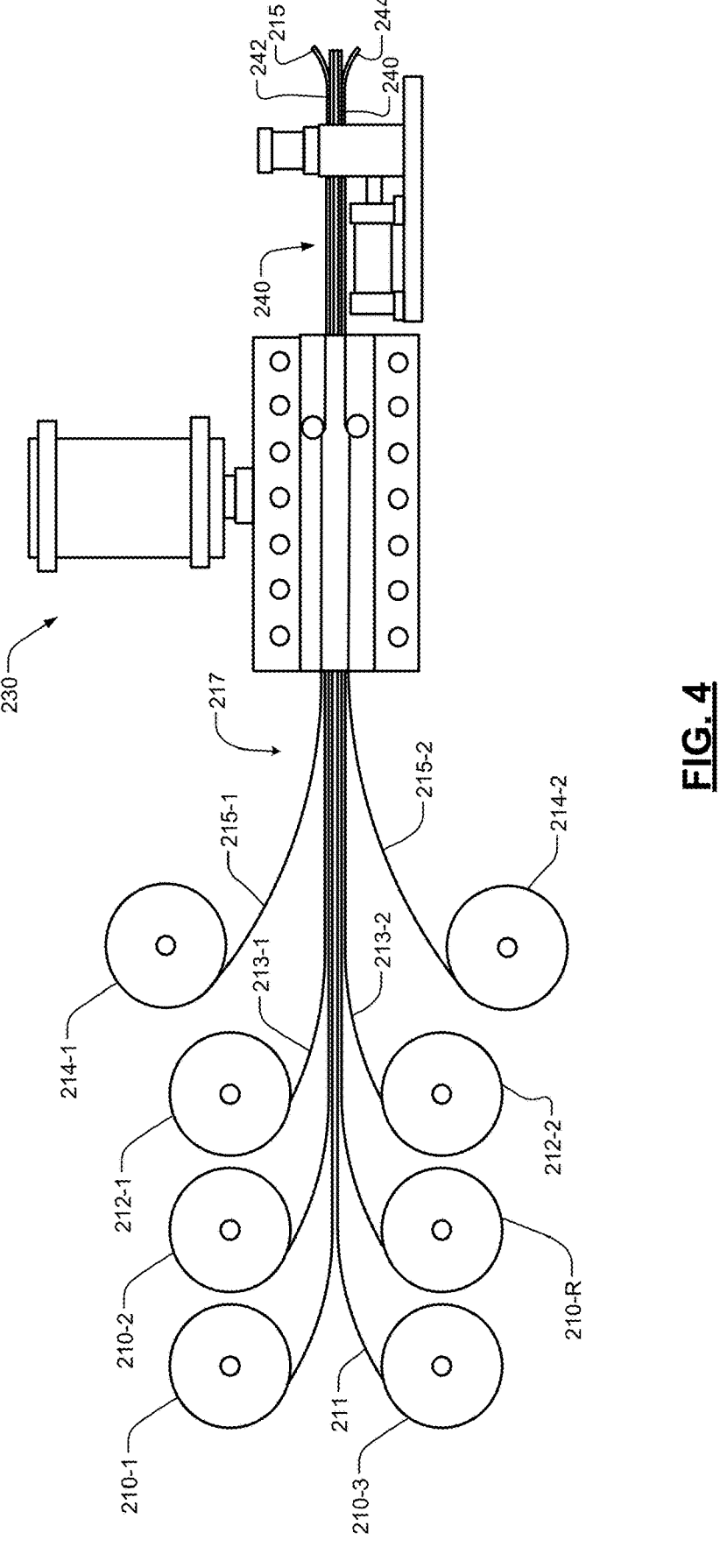
FIGS. 4 to 5D illustrate another example of a method for manufacturing a multi-layered and multi-functional thermoplastic composite structure according to the present disclosure.
Figure 5D:
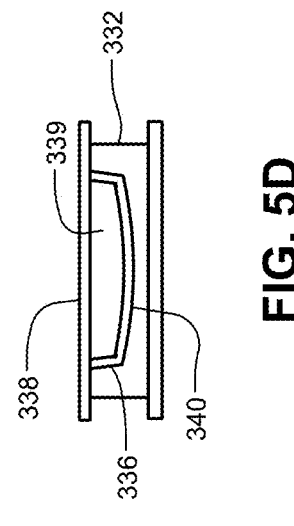

Referring now to FIGS. 4 to 5D, another example of a method for manufacturing a multi-layered and multi-functional thermoplastic composite structure is shown. In FIG. 4, reinforcing fiber layers 211 are supplied by one or more rolls 210-1, 210-2, . . . , and 210-R to an intermittent press 230, where R is an integer. In other examples, the reinforcing fiber layers 211 comprise unidirectional fiber reinforced polymer tape layered in a quasi-isotropic structure in which plies are placed in different directions (e.g., 0 deg/90 deg/+/− 45 deg). The core can also be comprised of a discontinuous fiber reinforced nonwoven mat that could be a single ply or stacked and consolidated as multiple plies. The core can also be comprised of directed long fiber melts.

A functional layer 213-1 is optionally supplied by a roll 212-1 on one side of a stack of layers 217 including the reinforcing fiber layers 211. A functional layer 213-2 is optionally supplied by a roll 212-2 on an opposite side of the stack of the reinforcing fiber layers 211.

Release layers 215-1 and 215-2 are optionally supplied by rolls 214-1 and 214-2 onto one or both outer sides of the stack of layers 217. The stack of layers 217 is fed to an intermittent press 230 where heating, pressing, and/or cooling is performed. A material feed outputs a consolidated laminate 240. In some examples, the consolidated laminate 240 is optionally cut to one or more predetermined lengths. The release layers 215 can be removed from the consolidated laminate 240 prior to subsequent processing (e.g., compression molding described further below).

Figure 5C:
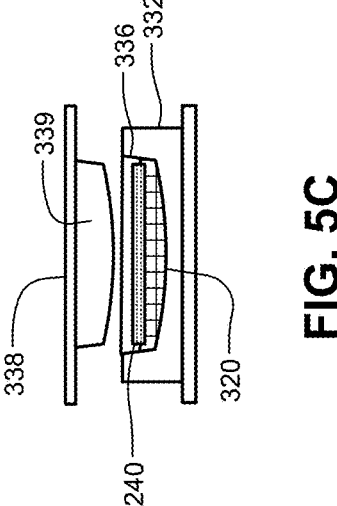
Figure 5A:
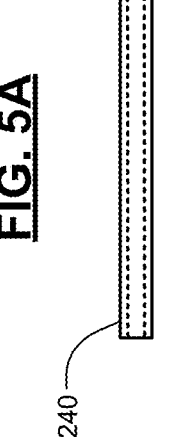
Figure 5B:
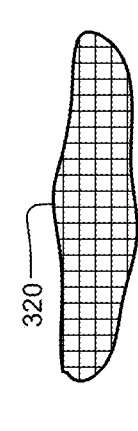

In FIGS. 5A to 5D, another example method for manufacturing the multi-layered and multi-functional thermoplastic composite structure using the consolidated laminate is shown. In FIGS. 5A and 5B, the consolidated laminate 240 and discontinuous fiber reinforced material 320 are supplied.

In FIGS. 5C and 5D, the consolidated laminate 240 and the discontinuous fiber reinforced material 320 are arranged in a cavity 336 of a lower mold portion 332. An upper mold portion 338 including a plug 339 is lowered into the lower mold portion 332 and heat and pressure are applied to stamp-form a multi-layered, multi-functional thermoplastic composite material 340.

Figure 6B:
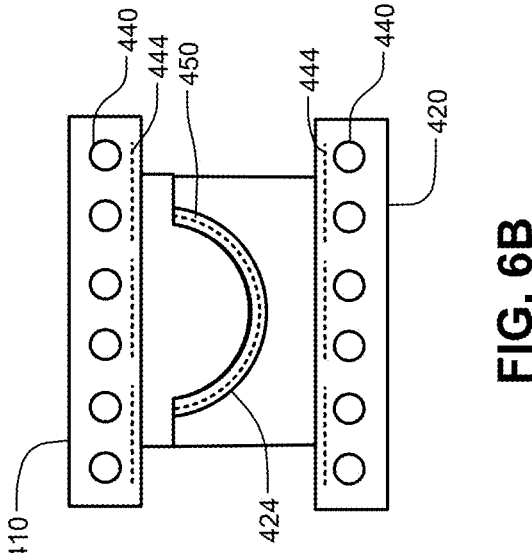
FIGS. 6A and 6B illustrate another example of a method for manufacturing a multi-layered and multi-functional thermoplastic composite structure according to the present disclosure.
Figure 6A:
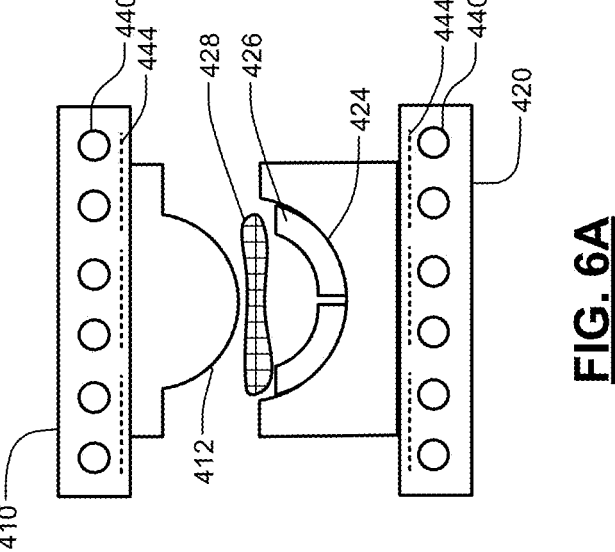

Referring now to FIGS. 6A and 6B, another example of a method for manufacturing a multi-layered, multi-functional thermoplastic composite material is shown. An upper mold portion 410 includes a plug 412 and a lower mold portion 420 includes a cavity 424 to receive the plug 412. A functional layer 426 (such as an EMI shielding layer and/or a TRP layer) is arranged in the cavity 424 along with the discontinuous fiber reinforced material 428.

After placing the functional layer 426 and the discontinuous fiber reinforced material 428, the upper mold portion 410 is pressed into the lower mold portion 420 to apply pressure and/or heat to produce a multi-layered and multi-functional thermoplastic composite structure 450. In some examples, the upper mold portion 410 and/or the lower mold portion 420 include heaters 444 and/or cooling channels 440 through which coolant flows. In some examples, cooling is performed after applying heat and/or pressure. In some examples, the heaters 444 include resistive heaters or inductive heaters.

After consolidation, the thermoplastic structural core material is optionally coated with one or more of the functional layers and cured. In some examples, spray, dip and/or flow coating is performed. In some examples, curing is performed using heat or UV light. In other examples, curing occurs due to a chemical reaction between reactants in the coating material.

For example, the fire retardant layer comprises a protective coating layer that is coated onto a composite structure. In some examples, the protective coating layer is applied in a liquid form using spray coating, dip coating, flow coating, and/or other suitable coating methods. In some examples, the coatings include fire retardant compounds, intumescent materials, hydrated materials, and ceramics, as well as binders, solvents, and other additives used in coatings. In some examples, the protective coating layer is cured using thermal, UV exposure, moisture, and/or chemical reactions at room temperature (or another temperature) when reactants are combined.

In some examples, the EMI shielding layer comprises a coating layer that is applied in a liquid form onto a composite structure and optionally cured as described above. In some examples, the EMI shielding layer includes a coating including conductive particles (e.g., copper, aluminum, silver, nickel, gold, tin, or graphene). In other examples, the shielding layer is applied using a metal plating process.

In some examples, the discontinuous reinforcing fiber flows in the compressing molding tool. In some examples, discontinuous carbon fiber charges are placed on top of at least one of the functional layers and the discontinuous reinforcing fiber charges flow within the mold cavity. In some examples, the compression molding tool is capable of rapid thermal cycling using both heating and cooling.

Figures 7A, 7B, 7C, 7D:
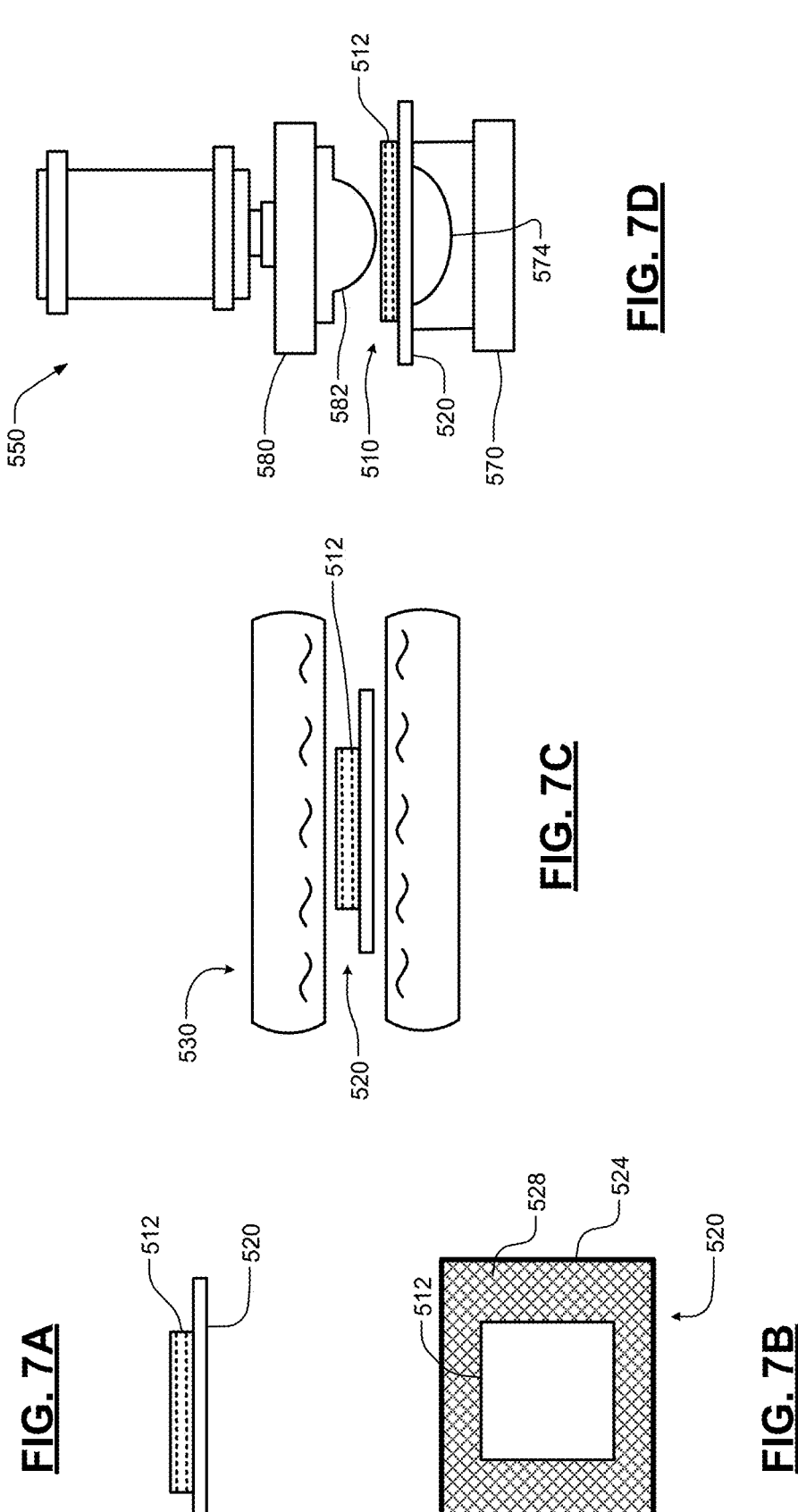
FIGS. 7A to 7D illustrate another example of a method for manufacturing a multi-layered and multi-functional thermoplastic composite structure according to the present disclosure.

Referring now to FIGS. 7A to 7D, another example of a method for manufacturing a multi-layered and multi-functional thermoplastic composite structure is shown. In FIGS. 7A and 7B, a consolidated laminate 512 (or alternately a functional layer and discontinuous fibers that have not been consolidated) is arranged on a support member 520 including a frame 524 defining an inner cavity and a mesh material 528 extending between edges of the frame 524 to cover the inner cavity. The consolidated laminate 512 includes one or more functional layers and discontinuous fibers as described above. In some examples, the mesh material 528 is made of aramid fibers such as poly-paraphenylene terephthalamide. In some examples, the frame 524 is made of metal, ceramic, and/or other structural and temperature resistant material. In some examples, the mesh material 528 is taut between edges of the frame 524. In other examples, edges of the mesh material 528 are held securely by the frame 524 and the mesh material 528 has enough slack to allow draping over contours of the tool/mold.

In FIG. 7C, the support member 520 and the consolidated laminate 512 are pre-heated in a heater 530 for a predetermined heating period prior to stamp-forming in a compression molding tool. In some examples, the heater 530 includes an infrared heater, a resistive heater, an inductive heater, a light emitting diode (LED) heater, and/or another type of heater. In FIG. 7D, after the predetermined heating period in the heater 530, the support member 520 and the consolidated laminate 512 are moved to a compression molding tool 550 including an upper mold portion 580 with a plug 582 and a lower mold portion 570 with a cavity 574. The upper mold portion 580 and the lower mold portion 570 are moved together to apply pressure to the consolidated laminate 512 arranged on the mesh material and to form a multi-layered and multi-functional thermoplastic composite structure.

The manufacturing methods for the multi-layered and multi-functional thermoplastic composite structure according to the present disclosure enable part consolidation and elimination of separate pieces and joining steps (e.g., welding). The manufacturing methods enable integration of structural and nonstructural regions into the same component in a one-step process where traditional molding approaches use a two-step molding process. The manufacturing methods eliminate secondary steps for applying and bonding functional layers by integrating the functional layers during compression molding. The manufacturing methods reduce manufacturing takt time to enable vehicle applications. The manufacturing methods are capable of producing high-strength/stiffness thermoplastic composite material systems with mass savings of at least 40% compared to metal solutions. The manufacturing methods also enable greater potential for reclaiming and recycling as compared to thermoset composites.

Examples of discontinuous fiber reinforced material include chopped unidirectional tape or nonwoven mat. Chopped unidirectional tape includes reinforcing fibers attached to or embedded in a substrate or backing layer and optionally includes pre-impregnated thermoplastic resin. In some examples, the resin is supplied to the mold cavity instead of or in addition to the pre-impregnated resin. In some examples, the chopped unidirectional tape is cut to lengths less than 2". Suitable reinforcing fibers include carbon fibers (e.g., carbon black, carbon nanotubes, talc, fibers derived from polyacrylonitrile, cellulosic precursors, and/or pitch precursors), glass fibers (e.g., fiber glass, quartz), basalt fibers, aramid fibers (e.g., poly-para-phenylene terephthalamide, polyphenylene benzobisoxazole (PBO)), and combinations thereof. In some examples, the reinforcing fibers are pre-impregnated with a thermoplastic polymer matrix. In some examples, the thermoplastic polymer matrix and/or the resin are selected from a group consisting of polyether ether ketone (PEEK), polyether ketone ketone (PEKK), polyphenylene sulfide (PPS), polyether imide (PEI), low melt PEEK (LMPEEK), polyaryletherketone (PAEK), and combinations thereof.

Examples of the TRP layer include an insulating material, a fire retardant material, and/or an intumescent material. Examples of fire retardant materials including fabric impregnated with fire retardant such as aluminum tetrahydrate (ATH) and ammonium polyphosphate (APP). An example of an intumescent material includes expanding graphite (EG). When heated above a predetermined temperature, the intumescent material expands and forms a protective char that acts as a barrier to fire. In some examples, the predetermined temperature corresponds to a temperature encountered during a thermal runaway event.

Examples of the EMI layer a woven metal mesh, a continuous or discontinuous flexible fabric, a coated veil, a metal sheet, a perforated metal sheet, or a metal-coated fiber-filled material.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. A method for manufacturing a multi-layered and multi-functional thermoplastic composite structure, comprising:

supplying a plurality of reinforcing layers including reinforcing fibers and thermoplastic resin to an intermittent press;

supplying at least one functional layer to the intermittent press adjacent to the plurality of reinforcing layers, wherein the at least one functional layer is selected from a group consisting of an electromagnetic shielding layer and a thermal runaway protection layer, and wherein the at least one functional layer includes a first functional layer arranged on one side of the plurality of reinforcing layers, and a second functional layer arranged on an opposite side of the plurality of reinforcing layers;

heating and pressing the plurality of reinforcing layers and the at least one functional layer to form a composite laminate;

arranging the composite laminate in a compression molding tool;

arranging discontinuous fiber reinforced material in the compression molding tool; and consolidating the discontinuous fiber reinforced material and the composite laminate to form the multi-layered and multi-functional thermoplastic composite structure, wherein the discontinuous fiber reinforced material flows into a stiffening feature of a mold cavity.

2. The method of claim 1, further comprising cooling the composite laminate using the intermittent press after pressing and heating.

3. The method of claim 1, wherein the discontinuous fiber reinforced material includes chopped unidirectional tape including reinforcing fibers selected from a group consisting of carbon fibers, glass fibers, basalt fibers, aramid fibers, and combinations thereof.

4. The method of claim 1, further comprising coating the multi-layered and multi-functional thermoplastic composite structure.

5. The method of claim 4, further comprising curing the coating.

6. The method of claim 1, wherein the compression molding tool includes a heater.

7. The method of claim 6, wherein the heater comprises an induction heater.

8. The method of claim 1, further comprising arranging the composite laminate on a support member including a frame defining an inner cavity and a mesh material extending over the inner cavity between edges of the frame.

9. The method of claim 8, further comprising positioning the composite laminate and the support member in an oven and heating the composite laminate and the support member for a predetermined period.

10. The method of claim 9, further comprising arranging the composite laminate and the support member in the compression molding tool and pressing the composite laminate to form the multi-layered and multi-functional thermoplastic composite structure.

11. The method of claim 1, wherein the reinforcing fibers are selected from a group consisting of carbon fibers, glass fibers, basalt fibers, aramid fibers, and combinations thereof.

12. The method of claim 11, wherein the reinforcing fibers are pre-impregnated with a thermoplastic polymer matrix selected from a group consisting of polyether ether ketone (PEEK), polyether ketone ketone (PEKK), polyphenylene sulfide (PPS), polyether imide (PEI), low melt PEEK (LMPEEK), polyaryletherketone (PAEK), and combinations thereof.

13. The method of claim 12, wherein the discontinuous fiber reinforced material is pre-impregnated with a thermoplastic polymer matrix selected from a group consisting of polyether ether ketone (PEEK), polyether ketone ketone (PEKK), polyphenylene sulfide (PPS), polyether imide (PEI), low melt PEEK (LMPEEK), polyaryletherketone (PAEK), and combinations thereof.

14. A method for manufacturing a multi-layered and multi-functional thermoplastic composite structure, comprising:

supplying to an intermittent press a plurality of reinforcing layers, a first functional layer on a first side of the plurality of reinforcing layers, and a second functional layer on a second side of the plurality of reinforcing layers that is opposite to the first side;

wherein the first functional layer and the second functional layer are each selected from a group consisting of an electromagnetic shielding layer and a thermal runaway protection layer;

forming a composite laminate by heating and pressing together in the intermittent press the first functional layer, the plurality of reinforcing layers, and the second functional layer;

arranging the composite laminate in a cavity of a compression molding tool, arranging a discontinuous fiber reinforced material in the cavity of the compression molding tool; and heating and pressing the composite laminate and the discontinuous fiber reinforced material to form the multi-layered and multi-functional thermoplastic composite structure.

15. The method of claim 14, wherein the compression molding tool includes at least one of an induction heater and cooling channels configured to receive coolant.

16. The method of claim 14, further comprising:

coating the multi-layered and multi-functional thermoplastic composite structure; and curing the coating.

17. The method of claim 14, wherein the discontinuous fiber reinforced material includes chopped unidirectional tape including reinforcing fibers selected from a group consisting of carbon fibers, glass fibers, basalt fibers, aramid fibers, and combinations thereof.

\* \* \* \* \*